United States Patent [19]

Hopperdietzel

[11] Patent Number: 5,324,760
[45] Date of Patent: Jun. 28, 1994

[54] POLYMER ALLOY OF POLYBUTADIENE AND OLEFINIC THERMOPLASTICS

[75] Inventor: Siegfried Hopperdietzel, Selb, Fed. Rep. of Germany

[73] Assignee: Rehau AG & Co., Rehau, Fed. Rep. of Germany

[21] Appl. No.: 37,177

[22] Filed: Mar. 22, 1993

Related U.S. Application Data

[60] Continuation of Ser. No. 655,286, Feb. 14, 1991, abandoned, which is a division of Ser. No. 520,208, May 8, 1990, abandoned.

[30] Foreign Application Priority Data

May 10, 1989 [DE] Fed. Rep. of Germany ....... 3915267

[51] Int. Cl.$^5$ ............................................. C08K 5/24
[52] U.S. Cl. ................................... 524/269; 524/505; 524/524; 524/529; 524/536; 525/105
[58] Field of Search ............... 524/269, 572, 575, 505, 524/524, 529, 536; 525/105

[56] References Cited

U.S. PATENT DOCUMENTS

| | | | |
|---|---|---|---|
| 3,578,481 | 5/1971 | Young | 524/269 |
| 4,386,179 | 5/1983 | Sterling | 524/269 |
| 4,525,531 | 4/1983 | Zukosky et al. | |
| 4,613,640 | 9/1986 | Deisler et al. | 524/269 |

FOREIGN PATENT DOCUMENTS

| | | | |
|---|---|---|---|
| 57-172948 | 10/1982 | Japan | 524/269 |
| 61-275357 | 12/1986 | Japan | 524/269 |
| 63-162745 | 7/1988 | Japan | 524/269 |
| 02-034613 | 2/1990 | Japan | 524/269 |
| 1349853 | 4/1974 | United Kingdom. | |

Primary Examiner—Melvyn I. Marquis
Assistant Examiner—Mark D. Sweet
Attorney, Agent, or Firm—Spencer, Frank & Schneider

[57] ABSTRACT

The present invention provides a copolymer comprising polybutadiene and other olefinic saturated or unsaturated thermoplastics. The mixing ratio between the polybutadiene and the thermoplastics is 30:70 to 95:5 weight percent. Surface improving additives, such as polysiloxane, may be added in quantities from 0.5 to 6 weight percent. The copolymer may be used to produce medical and food compatible semi-finished or finished products.

8 Claims, No Drawings

POLYMER ALLOY OF POLYBUTADIENE AND OLEFINIC THERMOPLASTICS

This application is a continuation of application Ser. No. 07/655,286, filed Feb. 14, 1991, now abandoned, which is a divisional appilcation of Ser. No. 07/520,208, filed May 8, 1990, now abandoned.

CROSS-REFERENCE TO RELATED APPLICATION

The present disclosure is related to the subject matter disclosed in Federal Republic of Germany Application No. P 39 15 267.7 of May 10, 1989, the entire specification of which is incorporated herein by reference.

BACKGROUND OF THE INVENTION

1. Field of the Invention

The present invention relates to a polymer alloy of polybutadiene and other olefinic saturated or unsaturated thermoplastics.

2. Technology Review

U.S. Pat. No. 4,386,179 discloses block copolymers of the styrene-butadiene-styrene (SBS) type or the styrene-ethylene-butylene-styrene (SEBS) type which are mixed with silicone oil and mineral oil. These mixtures provide an easily workable starting material for the production of, for example, medical articles such as balloon or endotrachial catheters. The end product is highly elastic. The mixtures have the drawback in that their intended use is limited to certain fields. The mixtures cannot be used to produce tubes that conduct liquids such as medicinal fluids, blood, and fat-containing liquid foods because the liquids leach components such as mineral oil out of the tubes' starting materials and the conducted liquids are contaminated.

Mixtures of polybutadiene with block copolymers and wetting agents based on sulfur improve the mixtures' processibility in subsequent vulcanization. Additives of 5 to 30 weight percent polybutadiene are added to the block copolymers. A major drawback of these mixtures is that they can be used in neither medical applications nor in the food industry because of the wetting agents.

One known advantage of using polybutadiene instead of polyvinyl chloride (PVC) is that polybutadiene is free of softener and polyvinyl chloride (PVC) components, which avoids the problems of the decontamination of objects made of polybutadiene. Polybutadiene does not have any migrating components which could contaminate the material flowing through it. Also, polybutadiene products do not absorb active materials from medical preparations, and components of polybutadiene products are not leached out by fat containing media, such as blood, milk, and fat containing nutrient solutions. Polybutadiene products have a low specific weight with high inherent elasticity, so in this respect they are ideal for medical and food industry applications.

Polybutadiene products have the drawback of not being easily connected using adhesive and not being easily produced in special configurations. Polybutadiene products have low heat resistance which preclude their sterilization in hot steam, and have a poor capability to return to their original shape as compared to PVC products. Further, the surfaces of polybutadiene products are rough and unsuitable in medical and food industry applications.

SUMMARY OF THE INVENTION

An object of the present invention is to provide a polymer alloy comprising polybutadiene free of wetting agents which, in view of its surface characteristics as well as its capability to be glued and the improved melt-break behavior, retains the positive characteristics of polybutadiene and substantially avoids its negative characteristics.

This object and others which become apparent as the specification progresses, are accomplished by the invention, according to which, briefly stated, a polymer alloy is provided which comprises polybutadiene and other olefinic saturated or unsaturated thermoplastics in a mixing ratio of 30:70 to 95:5 weight percent with surface improving additives. The polymer alloy is used for the production of semifinished or finished products which are compatible with medicinal preparations or foodstuffs.

The polybutadiene is a 1,2-polymer which is mixed with a thermoplastic, elastic block copolymer including polystyrene end blocks and polyolefin unsaturated center blocks such as polybutadiene or polyisoprene or saturated center blocks of polyolefins, in a mixing ratio of preferably 60:40 weight percent.

DETAILED DESCRIPTION OF THE INVENTION

The present invention provides a polymer alloy comprising polybutadiene and other olefinic saturated or unsaturated thermoplastics in a mixing ratio of 30:70 to 95:5 weight percent with surface improving additives. The polymer alloy is used for the production of semifinished or finished products which are compatible with medicinal preparations or foodstuffs.

The polybutadiene is a 1,2-polymer which is mixed with a thermoplastic, elastic block copolymer including polystyrene end blocks and polyolefin unsaturated center blocks such as polybutadiene or polyisoprene or saturated center blocks of polyolefins, in a mixing ratio of preferably 60:40 weight percent.

The polymer alloy according to the present invention provides polybutadiene extrudates with a greatly improved surface, which would otherwise melt and break. The improvement is so great that the end products can be used in medical and foodstuff applications. The surface roughness observed when processing pure polybutadiene no longer occurs in the mixture according to the invention and damaging wetting agents undesirable in medical and foodstuff applications are not used. Another significant advantage of the mixture is that although polybutadienes do not naturally adhere they can be connected by adhesives. All of the conventional manufacturing methods, such as using solvent adhesives, can be retained according to the present invention.

EXAMPLE 1

60% polybutadiene was mixed with 40% styrene-ethylene-butylene-styrene (SEBS). The resulting polymer alloy may be used to produce medical tubes having the aforementioned advantageous characteristics.

EXAMPLE 2

According to the invention, polybutadiene may be mixed with an ethylene vinyl acetate (EVA) containing 10 to 30% vinyl acetate at a mixing ratio of 5 to 30 weight percent.

Known mixtures of polybutadiene, ethylene vinyl acetate and foaming agents have been developed for the production of abrasion resistant foams, e.g. for shoe soles. Although the present invention is also directed toward improving the physical characteristics of polybutadiene, the present invention may be used in medicine and for the food industry, in which the known foaming agents and processing aids are not permitted.

80% polybutadiene was mixed with 20% ethylene vinyl acetate (EVA). The resulting polymer alloy is suitable, for example, in tubes for the application of medications. By comparison, medication flowing through a polyvinyl chloride (PVC) tube would be absorbed by the tube surface, for example, nitroglycerine containing medications conducted through a polyvinyl chloride (PVC) tube. Objects made of pure polybutadiene encounter problems concerning shutoff by clamping and susceptibility to kink. These problems are overcome by the present invention, for example, by the use of 80% polybutadiene mixed with 20% ethylene vinyl acetate (EVA).

EXAMPLE 3

The substance mixed with polybutadiene may be a low density polyethylene, a very low density polyethylene (LLDPE), or linear polyethylene having 1 to 3% short-chain branches in quantities of 30 to 70, preferably 40 to 60 weight percent.

Compared to pure polybutadienes, which have poor heat temperature resistance, the addition of polyolefins noticeably improves heat resistance. Since most sterilization processes in medicine and in the food processing industry involve the simultaneous application of heat, there are considerable advantages in using the mixture of the present invention as compared with unmixed polybutadienes.

50% polybutadiene was mixed with 50% very low density polyethylene (LLDPE). Tubes produced according to this example can be sterilized to prevent the negative side effects of pure polybutadiene.

EXAMPLE 4

Polybutadiene may be mixed with a polypropylene having a density $d=0.90$ to $0.91$ $g/cm^3$ in quantities of 1 to 10, preferably 1 to 4 weight percent. This mixture permits the realization of the above-described positive characteristics, for example, the poor heat resistance of the polybutadiene is noticeably improved by the addition of polypropylene.

58% polybutadiene was mixed with 34% styrene-ethylene-butylene-styrene (SEBS) and 8% polypropylene (PP).

EXAMPLE 5

According to the present invention, the substance mixed with polybutadiene may be an ethylene propylene diene monomer (EPDM) containing 5 to 30% elastomer and used in quantities of preferably 5 to 20 weight percent. The polymer alloy produced has the excellent elasticity of polybutadiene and the considerably improved temperature stability made possible by the ethylene propylene diene monomer (EPDM).

85% polybutadiene was mixed with 15% ethylene propylene diene monomer (EPDM).

EXAMPLE 6

Polysiloxane having a viscosity of 20 to 2000 centistokes, preferably 200 to 1000 centistokes may be added in quantities of 0.5 to 6 weight percent as a surface improving additive. The polysiloxane has the general formula $(-Si(R_1)(R_2)O-)_n$ where $R_1$, $R_2$ is H, $CH_3$ or Ph, with $R_1$, $R_2$ preferably being methyl groups.

U.S. Pat. No. 4,386,179 discloses polymer alloys of block copolymers of the SBS or SEBS type and silicone oil, but does not disclose a mixture of polybutadiene and silicone oil which improves the coagulation ability of polybutadiene.

98% polybutadiene is mixed with 2% silicone oil (viscosity 350 centistokes). By incorporating silicone oil in polybutadiene, the surface characteristics and compatibility with blood are improved. As indicated by resonance thrombographic comparisons between polybutadiene and polyvinyl chloride (PVC) on the one hand and polyurethane resin (PUR) on the other hand, the compatibility of polybutadiene with blood is poor. This negative characteristic is eliminated by the admixture of silicone oil.

Silicone oil can also be added in the appropriate quantity ratios indicated in Examples 1 to 5 so as to obtain the improved characteristics of polybutadiene.

EXAMPLE 7

The polymer alloys may also contain as an additive a release agent to avoid melting-breaking, nozzle deposits and to increase extrusion performance. Due to its tendency to meltbreak, polybutadiene can be extruded only under reduced power. Even with reduced power the resulting extrudate has a poorly closed surface which, as indicated by resonance thrombographic examinations, has an extremely poor compatibility with blood. By adding an external release agent which, according to the FDA, is authorized for use in a maximum quantity of 2.5% in the food packaging industry, the present invention's mixture produced a closed, well compatible surface. Moreover, this additive considerably improved extrusion performance.

98% polybutadiene was mixed with 2% of a release agent sold under the trade name PA 0831 LD by Constab Polymer-Chemie GmbH & Co., Rüthen.

Polybutadiene may be mixed with the substances as in the preceding Examples 1 to 5 as well. If the respective quantity ratios are considered, the release agent may be added to the polybutadiene together with the respective mixing partner.

The mixtures according to the present invention overcome the drawbacks of the polybutadiene material compared to polyvinyl chloride (PVC) material and have the advantages of polybutadiene for use in the medical and food industries. Thus, mixtures with styrene-butylene-styrene (SBS) or styrene-ethylene-butylene-styrene (SEBS) improve processibility, stress crack resistance, surface characteristics, temperature resistance, restoring capability, resistance to kinking and connectibility by gluing.

The mixtures according to the invention using other polyolefins such as low density polyethylene (LDPE), HDPE, polypropylene (PP), and very low density polyethylene (LLDPE) improve temperature resistance while the addition of silicone oil improves the surface, and its compatibility with blood and tissues. The mixtures with ethylene vinyl acetate (EVA) according to the invention improve springiness and stress crack resistance of the products manufactured from these alloys.

While the invention has been described in connection with specific embodiments thereof, it will be understood that it is capable of further modification and this application is intended to cover any variations, uses, or adaptations of the invention following, in general, the principles of the invention and including such departures from the present disclosure as come within known or customary practice with in the art to which the invention pertains and as may be applied to the essential features hereinbefore set forth, and as follows in the scope of the appended claims.

What is claimed is:

1. An elastic polymer alloy for medical and food industry applications comprising 1,2-polybutadiene, a thermoplastic elastic block copolymer having polystyrene end blocks and polyolefinic saturated or unsaturated center blocks, said polybutadiene and thermoplastic elastic blocks, said polybutadiene and thermoplastic elastic block copolymer mixed in a ratio of 30:70 to 95:5 weight percent, and from 0.5 to 6 weight percent of a polysiloxane having a viscosity of 20 to 2000 centistokes as a surface improving additive, to form an elastic polymer alloy.

2. A polymer alloy as recited in claim 1, wherein said polyolefinic center blocks are unsaturated and selected from the group consisting of polybutadiene and polyisoprene, and wherein said polybutadiene and thermoplastic elastic block copolymer are in a mixing ratio of 60:40 weight percent.

3. A polymer alloy is recited in claim 1, wherein said thermoplastic elastic block copolymer has polystyrene end blocks and saturated center blocks of polyolefins, and wherein said polybutadiene and thermoplastic elastic block copolymer are in a mixing ratio of 60:40 weight percent.

4. An elastic polymer alloy for medical and food industry applications comprising polybutadiene, an ethylene vinyl acetate containing about 10 to 30% vinyl acetate, and from 0.5 to 6 weight percent of a polysiloxane having a viscosity of 20 to 2000 centistokes as a surface improving additive, and wherein said polybutadiene and said ethylene vinyl acetate are in a mixing ratio of 5 to 30 weight percent.

5. An elastic polymer alloy for medical and food industry applications comprising polybutadiene and another olefinic saturated or unsaturated thermoplastic selected from the group consisting of a low density polyethylene, very low density polyethylene, and linear polyethylene, having about 1 to 3% short-chain branches, and from 0.5 to 6 weight percent of a polysiloxane having a viscosity of 20 to 2000 centistokes as a surface improving additive, and wherein olefinic saturated or unsaturated thermoplastic is present from about 40 to 60 weight percent.

6. An elastic polymer alloy for medical and food industry applications comprising polybutadiene, and from 0.5 to 6 weight percent of a polysiloxane having a viscosity of 20 to 2000 centistokes as a surface improving additive, and polypropylene having a density of about 0.90 g/cm$^3$ to 0.91 g/cm$^3$, and wherein said polypropylene is present from about 1 to 10 weight percent.

7. An elastic polymer alloy for medical and food industry applications comprising polybutadiene, and from 0.5 to 6 weight percent of a polysiloxane having a viscosity of 20 to 2000 centistokes as a surface improving additive, and ethylene propylene diene monomer comprising about 5 to 30% elastomer, and wherein said ethylene propylene diene monomer is present from about 5 to 30 weight percent.

8. A polymer alloy as recited in claim 1, further comprising a release additive.

* * * * *